United States Patent

[11] 3,568,978

| [72] | Inventor | Lester L. Larson |
| --- | --- | --- |
| | | Minneapolis, Minn. |
| [21] | Appl. No. | 831,625 |
| [22] | Filed | June 9, 1969 |
| [45] | Patented | Mar. 9, 1971 |
| [73] | Assignee | Paul E. Hawkinson Company |
| | | Minneapolis, Minn. |

[54] TIRE BEAD PROTECTOR
2 Claims, 5 Drawing Figs.

[52] U.S. Cl............................................. 254/50.1,
  157/13
[51] Int. Cl................................................... B60c 25/14
[50] Field of Search................................... 254/50.1-
  —50.4; 157/13; 144/288

[56] References Cited
UNITED STATES PATENTS

| 2,323,144 | 6/1943 | Long..................... | 254/50.4 |
| 2,905,435 | 9/1959 | Hawkinson............ | 254/50.3 |
| 2,919,105 | 12/1959 | Kaenan................. | 254/50.3 |

*Primary Examiner*—Robert C. Riordon
*Assistant Examiner*—David R. Melton
*Attorney*—Merchant and Gould

ABSTRACT: A tire bead protector for use with a pneumatic tire spreader during a retreading process. The protector consists of a pair of identical semi-circular lengths of cast high strength aluminum having an L-shaped cross section and connected end-to-end by a quick operating latch mechanism.

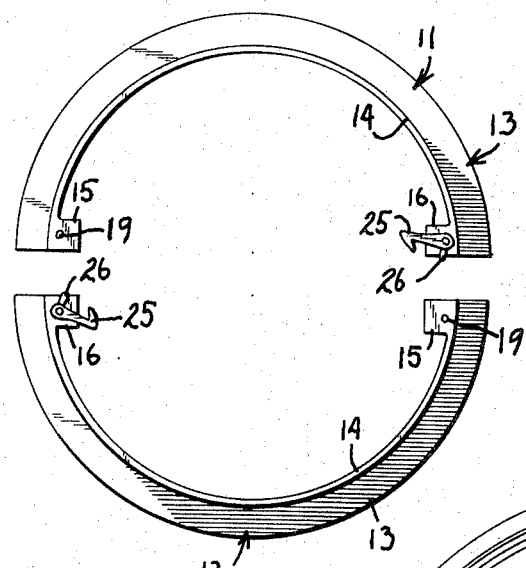
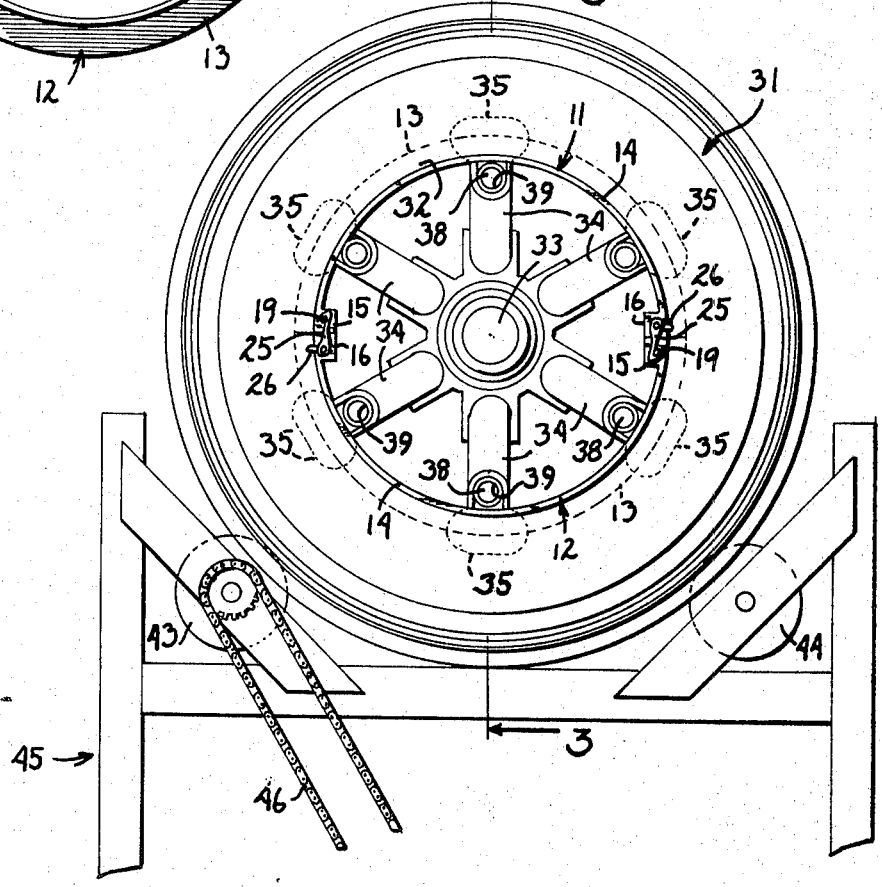

PATENTED MAR 9 1971 3,568,978

INVENTOR.
LESTER L. LARSON
BY
*Merchant & Gould*
ATTORNEYS

TIRE BEAD PROTECTOR

BACKGROUND OF THE INVENTION

1. Field of the Invention

The inventive device is intended for use with a pneumatic tire spreader similar to the one disclosed in U.S. Pat. No. 3,125,325 issued to W. V. Sornsen on Mar. 17, 1964.

Part of the tire retreading process requires the old tire casing to be spread apart for proper preparation of its surface and subsequent attachment of the new tread. The difficulty arising from such an operation is that such spreading creates great stress on the tire bead where it is engaged by the tire spreader. One method of preventing damage to the tire bead is to use a temporary circular rim that both protects the bead and uniformly distributes the spreader force over the entire bead.

2. Description of the Prior Art

An example of such a circular rim protector is disclosed in U.S. Pat. No. 2,850,263, issued to E. W. Hawkinson on Sept. 2, 1958. That patent discloses a rim comprising a plurality of arcuate segments connected by hinges.

The problem with this device stems from its pin-hinge latching mechanism, the manipulation of which is quite time consuming, and its lack of a retaining means movable to a retaining position when the protector is in use and movable to a nonretaining position when the protector is to be removed.

SUMMARY OF THE INVENTION

The device embodying the inventive concept solves these problems by including a latching mechanism that enables quick insertion and removal of the protector and provides a movable retainer that holds the protector in position upon engagement of the latching mechanism and moves into a non-retaining position when the latching mechanism is disengaged.

Further advantage arises from the use of the novel latching mechanism in combination with a single semicircular section, thus enabling any two sections to be connected to form a bead protecting device.

The disclosed tire bead protector is readily cast from high test aluminum, resulting in an extremely strong, lightweight and easily managed device.

BRIEF DESCRIPTION OF THE DRAWINGS

FIG. 1 is a top view of a pair of identical semicircular segments which together form a circular tire bead protector embodying the inventive concept;

FIG. 2 is a front view of a pneumatic tire spreader with which the tire bead protector of FIG. 1 is used, portions thereof broken away;

DESCRIPTION OF THE PREFERRED EMBODIMENT

Figure 4:
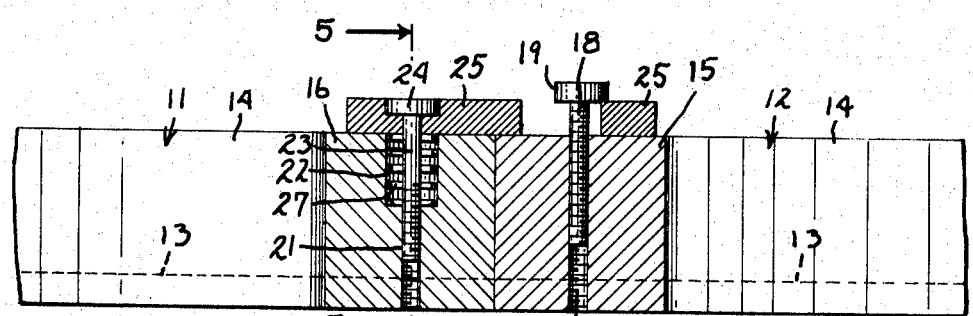
FIG. 4 is a side cross-sectional view of the bead protector latching mechanism in the engaged position.
Figure 5:
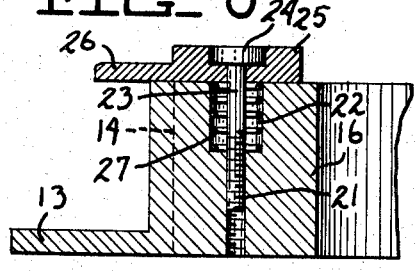
fig. 5 is a sectional view as seen substantially along a line 5-5 of FIG. 4, portions thereof broken away.

In FIGS. 1, 4 and 5 there is disclosed a tire bead protector for use with a pneumatic tire spreader consisting of identical semicircular segments 11, 12. Each of the segments 11, 12 has an L-shaped cross section with one leg 13 extending radially outward from the axis of the segment, and the other leg 14 extending in a direction parallel with the axis.

Leg 14 is thickened at both ends of the segment 11 as shown by numerals 15, 16, to receive a latching mechanism to join segments 11, 12. As shown in FIG. 4, end 15 has a first bore 17 in which is placed a first set pin 18 having a head portion 19. Pin 18 is fixed in bore 17 by threading or the like.

End 16 includes a first bore 21 and a concentric second bore 22 which is greater in diameter but lesser in length than bore 21. A latching hook 25, as best seen in FIG. 1, is pivotally attached to end 16 by a set pin 23 having a head portion 24, which is screwed into the bore 21. Latching hook 25 includes a protruding finger portion 26 (FIGS. 1, 2 and 5), the purpose of which will be described below.

In order to maintain latching hook 25 in a desired position, a friction fit is created by disposing in bore 22 a compression coil spring 27 (FIGS. 4 and 5), which continuously forces hook 25 against the head portion 24 of set pin 23.

Figure 3:
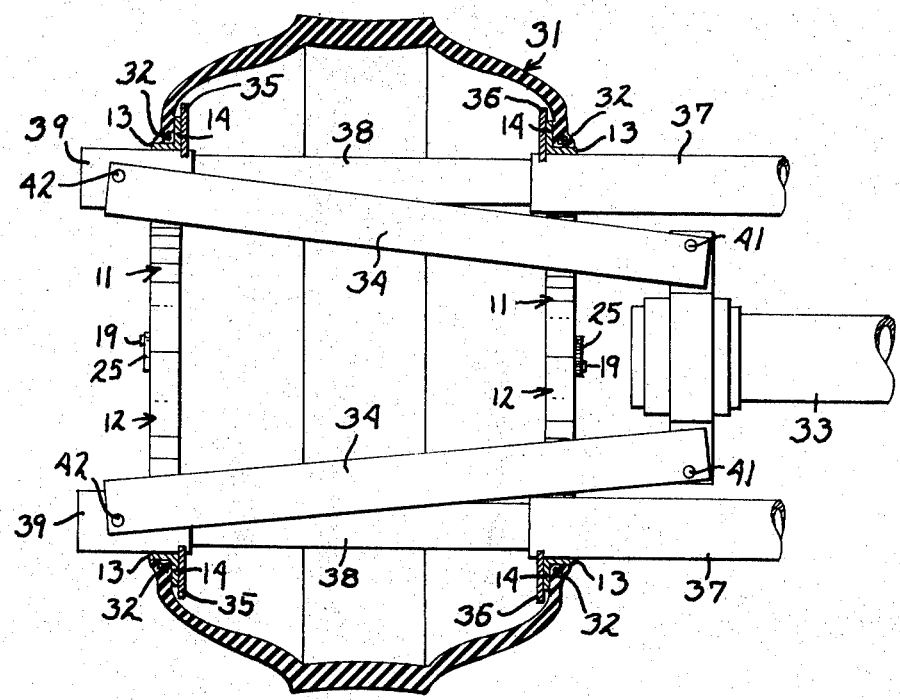
FIG. 3 is a sectional view as seen substantially along a line 3-3 of FIG. 2, portions thereof not shown.

A pneumatic tire spreader with which the inventive bead protector can be used is shown in FIGS. 2 and 3. The spreading of the pneumatic tire 31 having a bead 32 is affected by a plurality of spreading plates 35 associated with the bead 32 on one side of tire 31, and a second group of spreading plates 36 for the other side of tire 31. Each of the plates 36 is mounted on a cylindrical sleeve 37 which is sized to receive a slidable rod 38. Plates 35 are mounted on an enlarged portion 39 of rod 38.

Plates 35 and 36 are actuated to their respective spread positions by a power linkage mechanism including an extensible member 33, which is advanced and retracted by means not shown, and a plurality of actuator links 34 which are pivotally connected to member 33 as at 41, and to the enlarged portion 39 of rod 38 as at 42.

The connection of the several cylindrical sleeves 37 to the main housing of the tire spreader enables both axial and radial spreading of the tire 31 as extensible member 33 is advanced. Rollers 43, 44, which are mounted on a mobile base frame 45, enable the tire 31 to be rotated upon application of suitable power through an endless link chain by means not shown.

Because plates 35, 36 impart a concentrated force on the tire bead 32, it is necessary to employ a bead protector as disclosed. The inventive device can be very quickly installed by inserting each of the semicircular segments 11, 12 so that the leg 13 lies inside the tire casing and extends radially outward from bead 32, and leg 14 extends axially outward therefrom. Segments 11, 12 are then joined by latching the hook 25 over the set pin 18 of each of the two latching mechanisms. As hook 25 engages set pin 18, the protruding finger 26 extends outwardly in a direction essentially parallel to leg 13 (FIG. 5), to form therewith a retainer that prevents the bead protector from falling out of position prior to operation of the tire spreader.

Upon operation of the tire spreader to a spread position, the force imparted by plates 35, 36 to bead 32 of pneumatic tire 31 is uniformly distributed, and damage is thereby prevented.

I claim:

1. A device to be used with a pneumatic tire spreader for protecting the tire bead in a retreading process, comprising a semicircular length of material having an L-shaped cross section, two of such lengths connectable by means of a latching mechanism to form a circular rim which receives the tire bead; one leg of the L-shaped section extending radially outward and the other leg extending axially outward of the bead, both of the legs being longer than the greatest cross-sectional dimension of the bead; said other leg being thickened at the respective ends of the semicircular length to receive the latching mechanism; one of the thickened ends having a first bore to receive a first set pin, the pin including a head portion and being secured in the first bore so that the head portion extends a predetermined distance above the first bore; the other of the thickened ends having a second bore for receiving a second set pin and a third bore substantially concentric with and shorter than the second bore for receiving a compression coil spring, the second set pin having a head portion; a latching hook pivotally attached to the other of the thickened ends by means of the second set pin, the second set pin secured in the second bore so that the latching hook is biased against the head portion by the compression coil spring; the first and second bore is disposed so that the latching hook of one semicircular length can engage the first set pin of another such semicircular length; the latching hook further including a protruding finger extending in a direction essentially parallel to said one leg to form therewith a retainer for the device only when the latching hook is in an engaging position.

2. The device as described by claim 1, wherein the semicircular length is cast from high strength aluminum.